Feb. 2, 1937.  C. S. JOHNSON  2,069,451

CONTROL CHUTE MEANS

Filed Feb. 6, 1935

Inventor
CHARLES S. JOHNSON.

By Robb & Robb
Attorneys

Patented Feb. 2, 1937

2,069,451

UNITED STATES PATENT OFFICE 2,069,451

CONTROL CHUTE MEANS

Charles S. Johnson, Champaign, Ill.

Application February 6, 1935, Serial No. 5,297

4 Claims. (Cl. 83—73)

The present invention has to do with the art of agitation of materials, and particularly appertains to receptacles which do the agitating work and with which are associated a supply means in the nature of the outlet of a hopper or the mechanical equivalent thereof, namely, a supply chute by which materials may be charged into the agitating receptacle.

More specifically, the invention involves a peculiar combination of the agitating receptacle of the tilting type wherein a single opening is availed of for the purposes of charging and discharging the receptacle. The tilting movement of the receptacle is used for moving it to a discharging position and for restoring it to a normal agitating or mixing position in which it is charged with the materials or aggregates that are to be agitated or mixed.

My combination chute and mixing receptacle involves the provision of a stationary main chute and an associated movable auxiliary chute member, the purpose of the latter of which is to direct the materials from the main chute into the charging end or opening of the agitating receptacle or mixer. The requirement for moving of the auxiliary chute member is due to the fact that it normally lies so close to or within the charging end of the receptacle or mixer that when the mixer moves, as when tilting to discharge, the supply chute means must not interfere with such movement. Nor should the supply chute means in any way interfere with the rotation or agitating movement of the mixer or agitating receptacle.

With the foregoing in mind, therefore, I have so designed the supply or charging chute means employed with my tilting mixer unit that as the mixer moves downwardly, the movable chute member is automatically caused to shift out of the path of movement of the mixer, in which path said chute member normally lies. This provides for a free discharge of the contents of the mixer through the discharge opening. In like manner, by reason of the automatic action of the auxiliary chute member and its peculiar mounting in relation to the supply chute, the chute member will automatically resume its normal position forming a continuation of the supply passage of the main chute, and extending into a charging relation respecting the mixer when the latter assumes its normal or mixing position.

My invention comprehends certain other detailed features of construction and association of parts as will be more fully presented hereinafter in conjunction with the accompanying drawing, in which—

Figure 1:
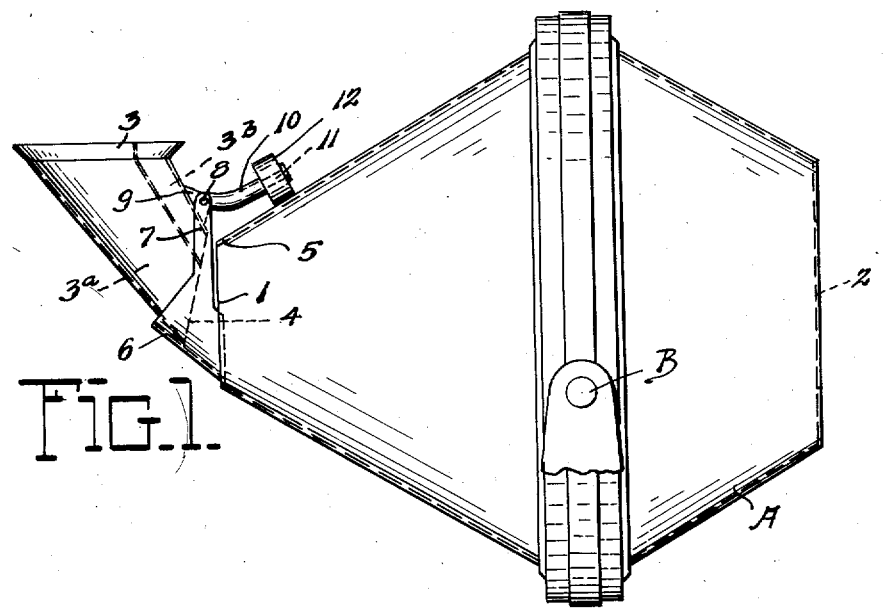
Figure 1 is a side view of a combined supply chute means and mixer embodying the essential features of the invention.

Describing my invention specifically, A in the drawing denotes what may be a conventional type of tilting mixer. This mixer is comprised of a hollow body or drum tapering toward its opposite ends, and is usually supported on trunnions such as may be located at the axis B, so as to facilitate the tilting operation of the mixer after a manner well known to those versed in the art. It will be apparent that when the mixer is in the position of Figure 1, substantially horizontal, it will hold a predetermined amount of aggregates or materials to be agitated or mixed, and by reason of the usual provisions, not illustrated, the mixer may be revolved to secure the agitation. In matter of fact, it is customary that the mixer continuously revolves, not only during agitation but during the charging and discharging operations, respecting the aggregates or materials that are being treated therewith or operated upon thereby.

The left end of the drum A is provided with an opening at 1 which may be characterized as a combination charging and discharging opening. The right-hand end may be closed as at 2, and associated with the opening 1 will be the supply chute means which comprises a main chute 3 divided into a lower compartment 3a and a shallow or much smaller upper compartment 3b. Dry aggregates or materials will be caused to pass through the compartment 3a of the chute 3, and a liquid, such as water used in the mixing of the dry aggregates, will be caused to pass through the compartment 3b of the chute 3. At its lower end the chute 3 is cut away at an angle as illustrated at 4 in a direction downwardly and outwardly inclined from the discharge opening 1 of the mixer A, this cut away portion being designed to provide the necessary clearance for the portion 5 at the open end of the mixer as the mixer is tilted downwardly at such end for purposes of discharge, for instance.

Now it is the special object of the invention to provide an auxiliary chute member intermediate the lower portion of the chute 3 and the charging end or opening of the mixer A which will span the space between these parts and carry the material or aggregates, dry and liquid, across said space and into the mixer A when the latter is in the position of Figure 1. For this purpose a very simple construction of device is utilized, consisting of the auxiliary chute member 6 which is of somewhat U-form when viewed from the end thereof, consisting of sides and a bottom wall portion with upwardly extending arms 7 pivotally supported upon the main chute 3 through an axis or shaft 8 mounted in suitable bearings in brackets 9 on the upper portion of the chute 3b. The chute 6 is fixed to the shaft 8, and also fixed to the shaft 8 is an actuating arm 10 reduced at its upper or outer end to provide an axis member 11 for a roller 12. The roller 12 is designed to travel on the outer surface of the drum A and is free to move inwardly and outwardly along said surface as it rotates thereon, in the direction of the longitudinal axis of the drum.

Normally the chute member 6 is adapted to have its lower part adjacent to the drum A slightly enter the charging opening 1, whilst the upper portion of the chute member 6 overlaps or extends upwardly beyond the lower open end of the chute 3. In this way the chute member 6 bridges the space between the parts 3 and A adjacent to the charging opening 1, and the materials comprising the dry aggregates fed from the compartment 3a and the liquid or water fed from the compartment 3b will thus readily pass into the drum A from the chute 3 when the parts are in the position of Figure 1.

Figure 2:
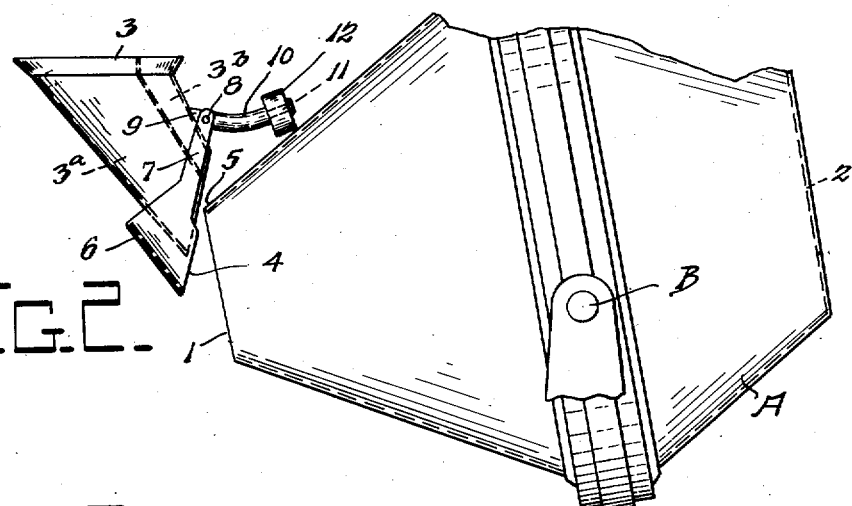
Figure 2 is a fragmentary view illustrating the adjustment of the parts of the supply chute means and the mixer when the mixer is tilted for dumping as compared with Figure 1 wherein the parts are in the positions assumed when the mixer is in its charging and mixing position.

Now it is to be understood that the weight of the arm 10 and the roller 12 is intended to be such as to overbalance the weight of the chute 6, and thus as the drum A tilts downwardly to bring the parts to the positions of Figure 2, the roller 12 maintains its contact with the outer adjacent surface of the drum A and causes the chute member 6 to gradually swing from the full line position of Figure 1 to its position of Figure 2, wherein the chute member 6 has been shifted a sufficient extent to the left as to be out of the way of the charging end of the drum as the latter tilts downwardly.

Now in the restoration of the drum to its normal mixing and non-discharging position, the chute member 6 will be caused to be gradually shifted to the right or toward the charging end of the mixer by the upward pushing effect of the surface of the drum which contacts with the roller 12. In this way the chute 6 will be automatically restored to its position of Figure 1 as the drum is restored to its non-discharging or mixing position by movement from its discharging adjustment as shown in Figure 2.

Figure 3:
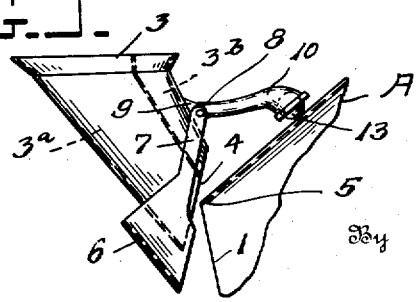
Figure 3 is a partial view illustrating a slight modification of the construction, involving a ball bearing arm for causing the automatic actuation of the auxiliary chute member.

Figure 3 illustrates how the arm 10 may be slightly modified in construction so as to provide a cup-like member which receives a freely movable ball bearing 13. This ball bearing is free to move in its socket or cup by rotation in all directions and may be effectively utilized as a substitute for the roller 12 previously described, to afford full freedom of movement of the arm 10 upwardly and downwardly as the said arm automatically controls the shifting of the chute member 6 under the influence of the movement of the mixing drum.

Of course it is to be understood that in lieu of using the weight of the roller 12 and arm 10 as the over-balancing means for elevating the chute 6 to its inoperative position, I may avail of a power spring acting downwardly upon the arm 10 as the mechanical equivalent.

It will be understood that I do not wish to adhere to the specific form of construction of the parts of the chute means, or the drum A as set forth herein, because the same may be modified according to the requirements for different shapes of drums and other conditions of practical construction, so long as the general principle of the arrangement and operation of the parts is utilized.

Having thus described my invention, what I claim as new and desire to secure by Letters Patent of the United States, is—

1. In combination, a tilting mixer having a charging opening, supply chute means therefor comprising a main chute, an auxiliary chute member pivoted to the main chute and movable into the path of tilting movement of the mixer and adapted to span the space between the main chute and the charging opening of the mixer, a pivotal support for the auxiliary chute member, an arm connected with said auxiliary chute member to move the latter on said pivotal support, and rolling means between said arm and the adjacent outer portion of the mixer, said rolling means having contact with the mixer when the latter is in charging position so as to maintain the auxiliary chute in position spanning the space between the main chute and the charging opening of the mixer, and said rolling means an arm mounted in gravitationally opposed relation to the auxiliary chute member and being of sufficient weight to overbalance the weight of the auxiliary chute member, and adapted by said overbalanced weight to automatically shift the auxiliary chute out of the path of the mixer incident to tilting of the mixer to discharging position.

2. In combination, a tilting mixer provided with a charging opening, supply chute means cooperable with said opening for charging the said mixer, the same including a chute member shiftable into the path of the tilting movement of the mixer responsive to registering said chute with said charging opening, and an instrumentality controlled by the movement of the mixer for positively maintaining such registered position during charging, said instrumentality further acting, when the mixer is moved to discharging position, to shift the chute member out of the path of movement of the mixer.

3. In combination, a tilting mixer having a charging opening, supply chute means therefor including a chute member mounted adjacent to the mixer and swingable towards and away from the mixer, means normally urging said chute member away from the mixer, said last-mentioned means including means projectable into the path of movement of the mixer so as to be engaged by the mixer when the latter is tilted to charging position, whereby to swing said chute member towards the mixer and operatively position the chute member for supplying materials to the mixer through the charging opening, and said last-named means further acting to shift the chute member away from the mixer as the mixer is tilted to discharging position.

4. In combination, a tiltably mounted mixing drum having a charging opening, supply chute means for supplying materials to the drum, and including a chute member mounted for swinging movement towards and away from the drum, and means for swinging the chute member responsive to tilting movements of the drum, said last-named means including a part operatively connected with the chute member and projecting into the path of movement of the drum so as to be continuously engaged by the latter as the drum approaches charging position, the movement of said drum to such position serving to swing said chute member towards the drum into register with the charging opening by reason of the continued engagement of the projecting part with the drum as aforesaid.

CHARLES S. JOHNSON.

CERTIFICATE OF CORRECTION.

Patent No. 2,069,451.           February 2, 1937.

CHARLES S. JOHNSON.

It is hereby certified that error appears in the printed specification of the above numbered patent requiring correction as follows: Page 2, second column, line 35, claim 1, for the word "an" read and; and that the said Letters Patent should be read with this correction therein that the same may conform to the record of the case in the Patent Office.

Signed and sealed this 23rd day of February, A.D. 1937.

(Seal)

Henry Van Arsdale
Acting Commissioner of Patents.

movement towards and away from the drum, and means for swinging the chute member responsive to tilting movements of the drum, said last-named means including a part operatively connected with the chute member and projecting into the path of movement of the drum so as to be continuously engaged by the latter as the drum approaches charging position, the movement of said drum to such position serving to swing said chute member towards the drum into register with the charging opening by reason of the continued engagement of the projecting part with the drum as aforesaid.

CHARLES S. JOHNSON.

CERTIFICATE OF CORRECTION.

Patent No. 2,069,451. February 2, 1937.

CHARLES S. JOHNSON.

It is hereby certified that error appears in the printed specification of the above numbered patent requiring correction as follows: Page 2, second column, line 35, claim 1, for the word "an" read and; and that the said Letters Patent should be read with this correction therein that the same may conform to the record of the case in the Patent Office.

Signed and sealed this 23rd day of February, A.D. 1937.

(Seal)

Henry Van Arsdale
Acting Commissioner of Patents.

CERTIFICATE OF CORRECTION.

Patent No. 2,069,451. February 2, 1937.

CHARLES S. JOHNSON.

It is hereby certified that error appears in the printed specification of the above numbered patent requiring correction as follows: Page 2, second column, line 35, claim 1, for the word "an" read and; and that the said Letters Patent should be read with this correction therein that the same may conform to the record of the case in the Patent Office.

Signed and sealed this 23rd day of February, A.D. 1937.

(Seal)

Henry Van Arsdale
Acting Commissioner of Patents.